(12) United States Patent
Habisreitinger et al.

(10) Patent No.: US 7,686,910 B2
(45) Date of Patent: Mar. 30, 2010

(54) METHOD AND DEVICE FOR THE AUTOMATED APPLICATION OF PAINT FILM TO BODYWORK PARTS

(75) Inventors: Uwe Habisreitinger, Lossburg (DE); Bernhard Nordmann, Boeblingen (DE)

(73) Assignee: Daimler AG, Stuttgart (DE)

( * ) Notice: Subject to any disclaimer, the term of this patent is extended or adjusted under 35 U.S.C. 154(b) by 724 days.

(21) Appl. No.: 10/568,797

(22) PCT Filed: Aug. 10, 2004

(86) PCT No.: PCT/EP2004/008926

§ 371 (c)(1), (2), (4) Date: Feb. 5, 2007

(87) PCT Pub. No.: WO2005/021241

PCT Pub. Date: Mar. 10, 2005

(65) Prior Publication Data

US 2007/0227645 A1    Oct. 4, 2007

(30) Foreign Application Priority Data

Aug. 26, 2003    (DE) .............................. 103 39 067

(51) Int. Cl.
| | |
|---|---|
| B44C 1/165 | (2006.01) |
| B44C 1/17 | (2006.01) |
| B29C 65/48 | (2006.01) |
| B32B 37/10 | (2006.01) |
| B32B 37/12 | (2006.01) |
| B32B 37/26 | (2006.01) |

(52) U.S. Cl. ..................... 156/249; 156/230; 156/231; 156/232; 156/233; 156/235; 156/237; 156/238; 156/239; 156/240; 156/241; 156/229; 156/247; 156/251; 156/252; 156/344; 156/540; 156/584

(58) Field of Classification Search ................ 156/229, 156/230–235, 237–241, 247, 249, 251, 252, 156/344, 540, 584

See application file for complete search history.

(56) References Cited

U.S. PATENT DOCUMENTS 2,560,307 A * 7/1951 Slemmons .................. 305/110

(Continued)

FOREIGN PATENT DOCUMENTS

DE    196 42 831    4/1998

(Continued)

OTHER PUBLICATIONS

English Abstract of DE 102007041423.*

(Continued)

*Primary Examiner*—Philip C Tucker
*Assistant Examiner*—Sing P Chan
(74) *Attorney, Agent, or Firm*—Davidson, Davidson & Kappel, LLC

(57) ABSTRACT

A method and a device for the automated application of a self-adhesive paint film to a three-dimensionally curved bodywork part, using a robotic application tool, the paint film being held ready in the form of a multi-layered film composite ready for picking up. After picking up has taken place, a protective strip on the adhesive side is removed from the film section, which is held taut, by means of a contact piece attached to the film composite on the end side and the adhesive side of the film section is thereby exposed. The paint film section is subsequently aligned above the body part to be covered, at a small distance from it, and is progressively pressed onto the bodywork part from the spaced-apart, taut position by means of a roller or doctor moving over the paint film. In order to be able to apply even large or curved paint film sections without creases and at justifiable tool costs, use is made of a rectangular film composite which protrudes on all sides over the bodywork portion to be covered and is secured on all four sides in a rectangular suction frame. As a result, during the application of the paint film, the latter is held under tensile stress in the longitudinal direction and in the transverse direction. To simplify the tool, the protective strip on the adhesive side is removed from the paint film in a stationary manner.

19 Claims, 8 Drawing Sheets

U.S. PATENT DOCUMENTS

| | | | | |
|---|---|---|---|---|
| 4,828,637 | A * | 5/1989 | Mentzer et al. | 156/212 |
| 5,092,954 | A * | 3/1992 | Braun et al. | 156/540 |
| 5,676,789 | A * | 10/1997 | Hamamura | 156/344 |
| 5,716,262 | A * | 2/1998 | Kiba | 451/103 |
| 6,001,198 | A * | 12/1999 | Habisreitinger et al. | 156/64 |
| 6,354,426 | B1 | 3/2002 | Habisreitinger et al. | 198/345.3 |
| 6,514,371 | B2 * | 2/2003 | Justin | 156/229 |
| 6,528,109 | B1 * | 3/2003 | Filev et al. | 427/9 |
| 7,459,051 | B2 * | 12/2008 | Habisreitinger et al. | 156/230 |
| 2003/0183327 | A1 | 10/2003 | Titze | 156/212 |

FOREIGN PATENT DOCUMENTS

| | | |
|---|---|---|
| DE | 198 09 515 | 9/1999 |
| DE | 100 13 224 | 9/2001 |
| DE | 102 30 034 | 1/2004 |
| DE | 102005005150 A1 * | 8/2006 |
| DE | 102007041423 A1 * | 3/2009 |
| JP | 63288721 A * | 11/1988 |
| JP | 08259098 A * | 10/1996 |
| JP | 11 011408 | 1/1999 |
| WO | WO 9944891 A1 * | 9/1999 |
| WO | WO 00/21734 | 4/2000 |
| WO | WO 00/76750 | 12/2000 |
| WO | WO 01/05902 | 1/2001 |

OTHER PUBLICATIONS

English Abstract of WO 9944891.*
English Abstract of DE 102005005150.*
English Abstract of JP 08-259098.*
English Abstract of JP 63-288721.*

* cited by examiner

METHOD AND DEVICE FOR THE AUTOMATED APPLICATION OF PAINT FILM TO BODYWORK PARTS

The invention relates to a method and a device for the automated application of paint film to bodywork parts. The invention starts from the applicant's earlier patent application, which has not been published before the date of the present application, according to German laid-open publication DE 102 30 034 A1. A method for the automated application of a self-adhesive paint film to a bodywork part secured in a defined position using a freely programmable industrial robot provided with an application tool, which paint film is held ready in the form of a multi-layered film composite in a defined position in the working region of the industrial robot for picking up into the application tool by means of suction grippers is regarded as known. In this method a protective strip, which is on the adhesive side and is provided with a contact piece attached on the end side, is grasped at the contact piece, is removed from the film section, which is held taut, and its adhesive side is thus exposed. Furthermore, in this method the paint film section, which is held taut, is aligned in a precise position above the bodywork part to be covered, at a small distance from it, and, from the visible side of the paint film, with the paint film held in a fixed position over the bodywork part to be covered, is pressed progressively onto the bodywork part from the spaced-apart, taut position owing to a line of application moving over said paint film. Also regarded as known is a device for the automated application of self-adhesive paint film to a bodywork part secured in a defined position.

BACKGROUND

In vehicles, the bodywork surface situated between two adjacent glass surfaces is frequently, for stylistic reasons, to be covered by a frequently high-gloss paint film colored black or in a dark color in order thereby to impart the impression at this point of a continuous glass surface. Although generally the two adjacent, vertical frame posts of the window frames in the region of the central pillar of the vehicle are possibilities here, the horizontally situated bodywork strip above the windshield, in the case of vehicles with a lamella roof or glass roof, is also, for stylistic reasons, usually provided with a dark colored paint film in order to provide the visual impression here too of a uniformly continuous surface.

In the case of the lateral application of the paint film, the latter is applied to the frame posts of the window frame of the side doors. Since these bodywork surfaces generally only constitute narrow and short strips, the section of the elongate paint film to be applied is also not particularly large and, in an emergency, could even be applied manually. By contrast, it is a different matter in the case of the horizontally situated bodywork strip in the roof region above the windshield. A paint film section provided for this is not only relatively long and unwieldy and could not possibly be handled by one person on their own; but also access to the application point in the roof region of a vehicle is extremely difficult. In the case of a manual application of a paint film in the front roof region, this could only be carried out by four people who all have to be very well coordinated with one another in order to obtain an approximately crease- and bubble-free application result. Since the paint film remains on the vehicle for the entire duration of use thereof, the paint film has to be correspondingly permanently adhered to the bodywork, with it having to be taken into consideration that the roof portion covered in this manner is situated in the visible region of the vehicle users, at least as they get into the vehicle, and therefore the requirements for a satisfactory application of the film are particularly exacting.

For the automated application method which is mentioned at the beginning and is known from the earlier patent application (DE 102 30 034 A1), a three-layered film composite which is suitable for this is proposed, the film composite bearing a respective surface-covering protective film or a protective paper on both sides of the actual paint film section. For the mechanical handling of the elongate film composite, what is referred to as a contact piece is attached to its two ends, i.e. the protective film strips protrude at the ends. At these contact pieces protruding on the longitudinal side, and only at these, the film composite is grasped from a flat holding-ready position by means of controllable, flat suction grippers of a robotic tool, the suction grippers being tilted outward after picking up the film composite from the picking-up plane. In the case of the known method, the film composite is therefore only grasped at the two narrow sides lying opposite each other and is handled in this manner. The tilting away of the suction grippers enables the film composite, which is held taut and is to be doctored onto the bodywork, is squeezed out of the picking-up plane in a V-shaped manner without the contact surface being partially exposed at the suction grippers. In addition, at one end of the film composite, a second, separate contact piece for the protective film on the adhesive side is provided, which contact piece protrudes over the first contact piece. With the use of this further contact piece, the protective film on the adhesive side can be removed from the film composite in an automated manner before the actual paint film application, i.e. the adhesive side of the paint film can be exposed.

With the technology according to earlier patent application DE 102 30 034 A1 it is indeed possible for the first time, as far as the applicant knows, to apply paint films in an automated manner to bodywork parts, which, in addition to the advantage of release from strenuous and monotonous manual work, has the further substantial advantage of a paint film application which is always in a precise position and is bubble- and crease-free. On the other hand, however, it has been shown in the attempt to use the earlier method and the associated application tool for applying relatively large and/or curved paint film sections to relatively large bodywork portions, i.e. to the roof region above the windshield of a vehicle with a lamella roof or glass roof, that certain problems and/or disadvantages are associated therewith. Firstly, in the case of very large films, an inherent stiffness of the film composite is almost totally ineffective in the sense of avoiding the formation of creases during the application. On the contrary, large paint film sections of the type discussed here would not readily be able to be applied in a crease-free manner using the earlier technology. In addition, curved paint film sections cannot be stretched out from opposite ends in one direction, for example in the longitudinal direction, without creasing. If the robotic tools were constructed according to the model from the earlier application and were dimensioned in accordance with the size of the paint film sections discussed here, they would not only be unjustifiably large and bulky, but also very heavy, which restricts the freedom of movement of the robotic tool. In addition, the robotic tools would be very expensive as a result.

SUMMARY OF THE INVENTION

It is an object of the invention to improve a method taken as the basis according to the generic type and the corresponding device to the effect that even large and/or curved paint film sections and/or three-dimensionally curved surfaces can readily be applied and/or covered in a manner free from creasing, that the robotic tool remains within justifiable limits with regard to weight, structural outlay and costs, and that despite the unavoidable structural size, the mobility of the robot is not unreasonably affected.

According thereto, use is made of a rectangular film composite which protrudes over the body portion to be covered on all sides by more than just a fold. This film composite is secured on all four sides by means of a rectangular suction frame arranged in the application tool, so that during the application of the paint film the latter can be held under tensile stress in the longitudinal direction and in the transverse direction. By omitting a protective-film removal device integrated in the tool the application tool is structurally more simple, lighter, more maneuverable and more cost-effective. Accordingly, the protective strip on the adhesive side is removed from the paint film in a stationary manner.

BRIEF DESCRIPTION OF THE DRAWINGS

The invention is explained below with reference to various exemplary embodiments illustrated in the drawings, in which.

DETAILED DESCRIPTION

Figure 13:
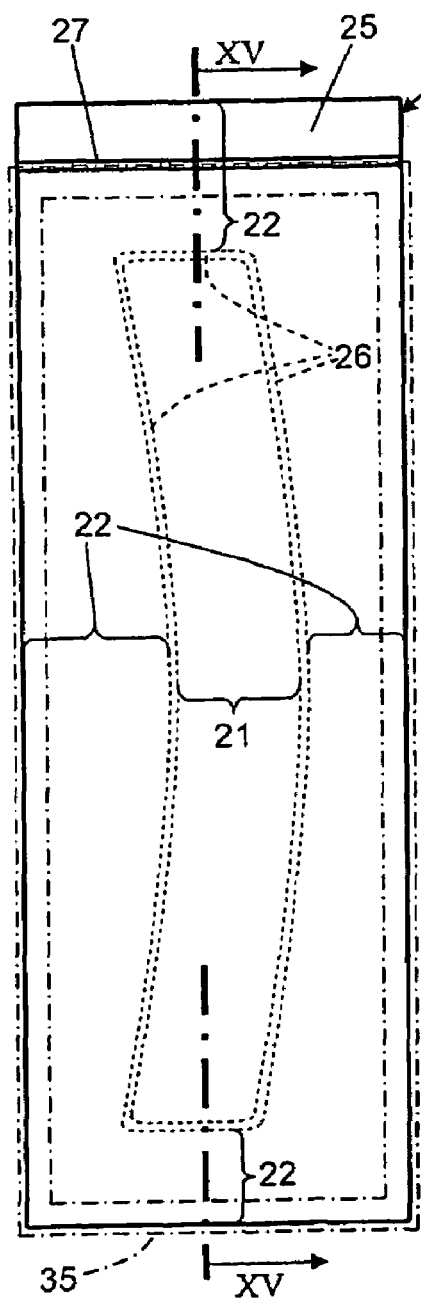
FIGS. 13 and 14 show a plan view (FIG. 13) and side view (FIG. 14) of a three-layered film composite, with certain details from FIG. 14 being shown on an enlarged scale.
Figure 14:
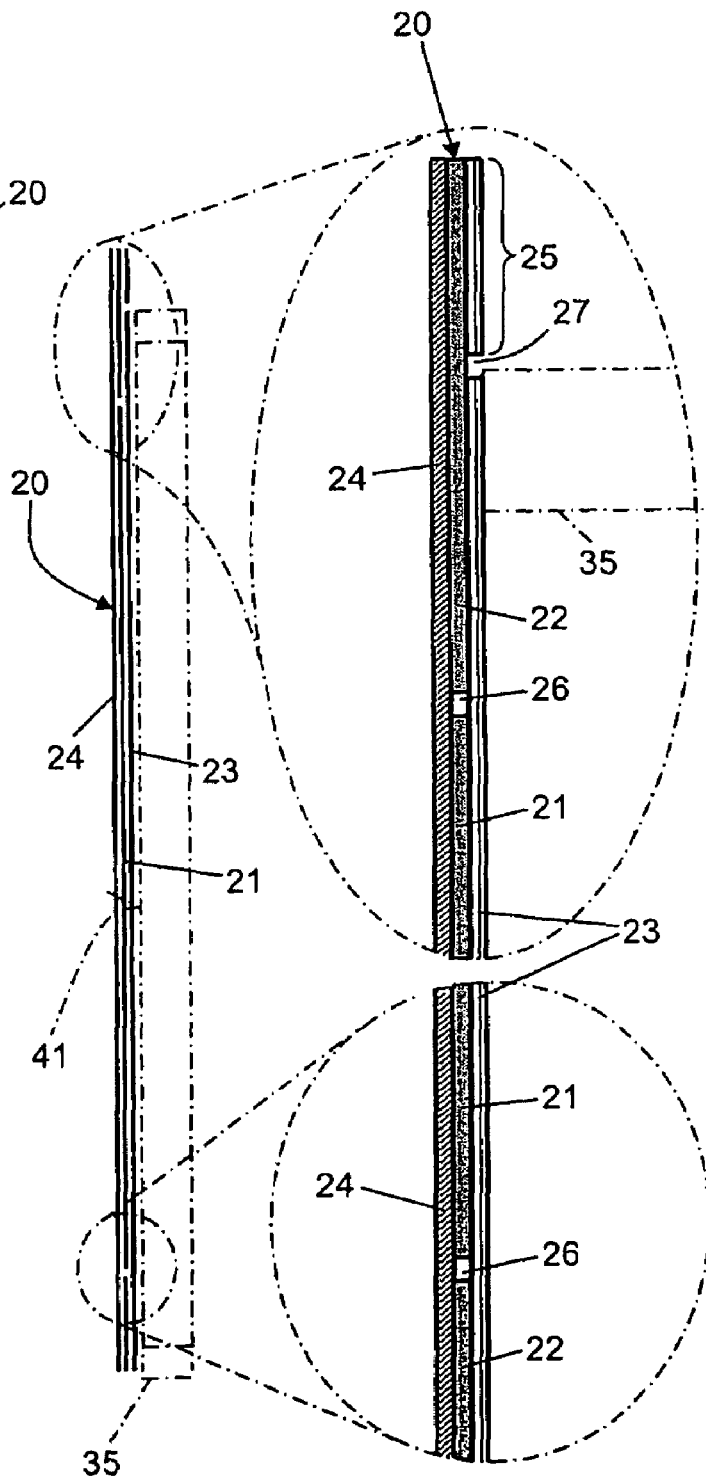

By means of the present invention, a self-adhesive paint film is to be applied in an automated manner to a bodywork part 3, which is secured in a defined position, of a vehicle bodywork 1 in a manner such that it can be reproduced precisely with regard to the relative position on the bodywork part and such that it is crease- and bubble-free. The exemplary embodiment illustrated is a bodywork with just two doors 4 and with a removable roof in which the upper ends of the two A-pillars 2 are connected by a transverse roof post 3. The surface thereof visually constitutes the connection between the windshield and the roof surface. For this reason, it may be stylistically desirable if the visible side of the transverse roof post is dark colored, preferably black, irrespective of the color of the vehicle, which can be achieved most simply by sticking on a self-adhesive paint film. A paint film which can be applied in a manner suitable for automation has to be integrated in a film composite which may be formed with two layers (FIGS. 2 to 10) or three layers (FIGS. 13 and 14).

Figure 6:
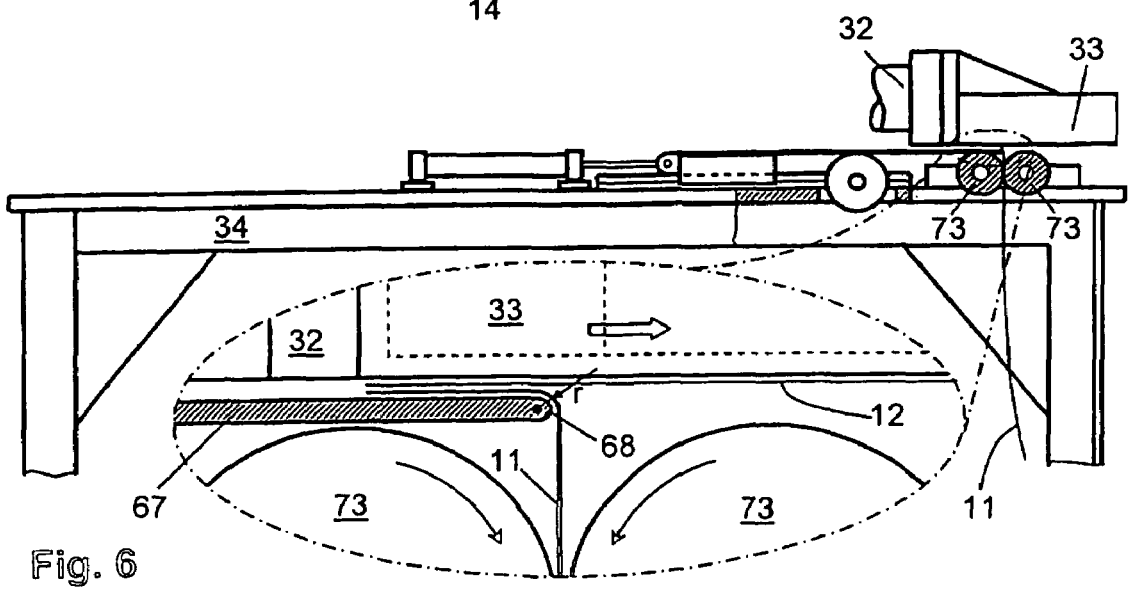
Figure 7:
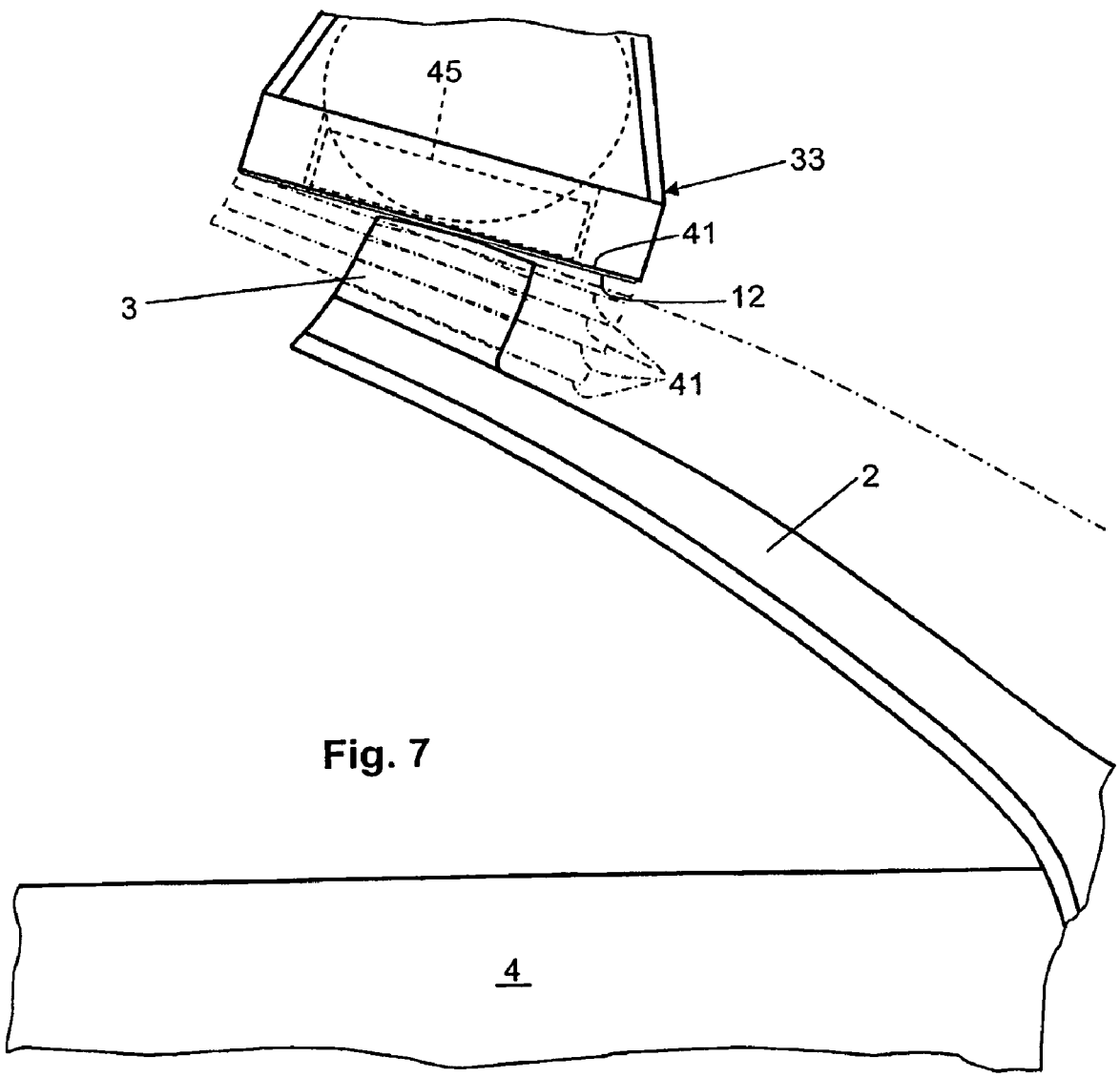
FIG. 7 shows the application tool during the alignment of the picked-up paint film above the bodywork part to be covered, before and during the application.
Figure 8:
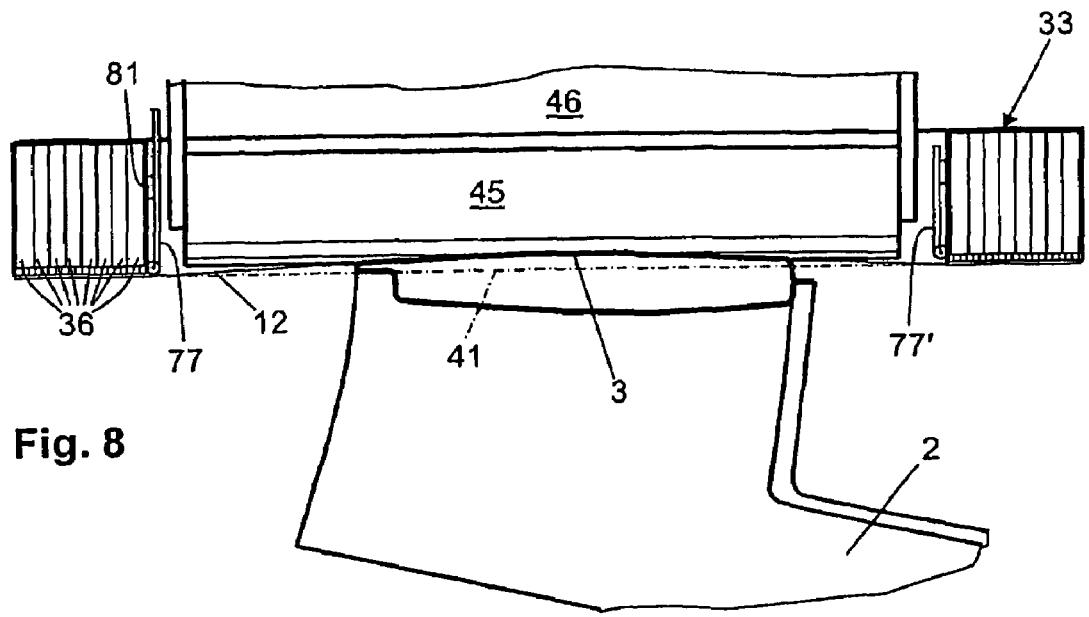
FIGS. 8 and 9 show a cross section through (FIG. 8) and partial plan view (FIG. 9) of the application tool according to FIGS. 1 to 7.
Figure 9:
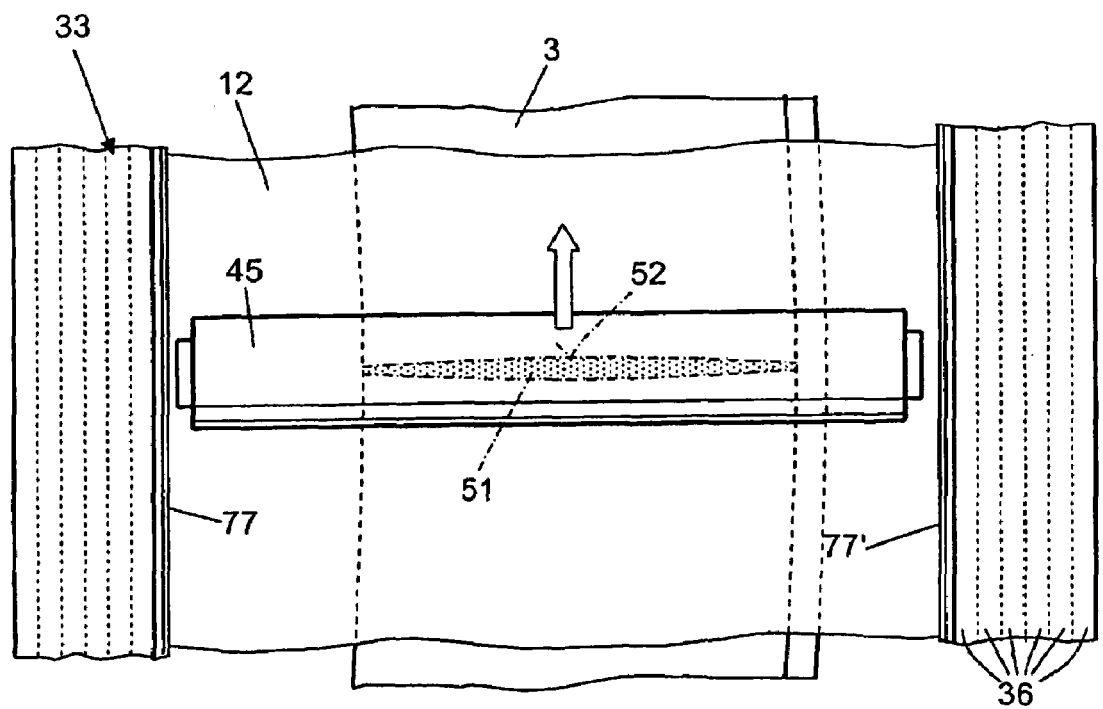
Figure 10:
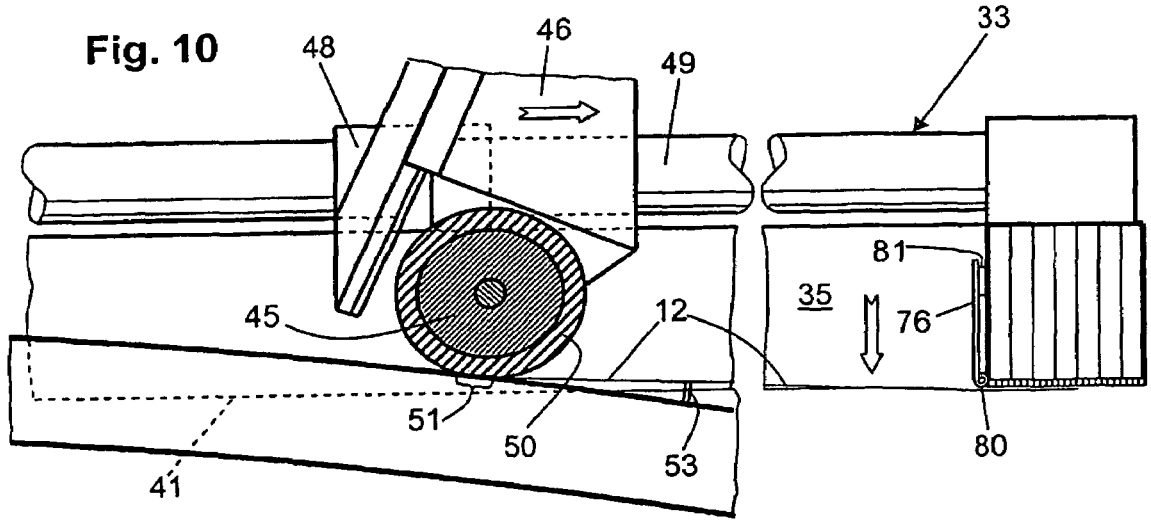
FIG. 10 shows the operation of pressing the paint film onto the bodywork part by means of a press-on roller.

For the automated application of a paint film of this type, use is made of a freely programmable industrial robot 30 which bears an application tool 33. The film composite containing the paint film to be applied is held ready in a defined position in the working region of the industrial robot (storage stack 65), so that it can be picked up into the application tool by means of a suction gripper. The end side of the film composite is provided with a contact piece 13 or 25, so that before the actual application a protective strip 11 or 24 on the adhesive side can be grasped at it, removed from the film section, which is held taut (phase sequence of FIGS. 3 to 6) and thus the adhesive side thereof can be exposed. The paint film section which is held taut is aligned in a precise position above the bodywork part to be covered, at a small distance from it (FIG. 7). From the visible side of the paint film, with the paint film held essentially in a fixed position above the bodywork part to be covered, the paint film is then progressively pressed onto the bodywork part from the spaced-apart, taut position owing to a line of application moving over the paint film (FIGS. 8 to 10).

In order to be able readily to apply even large and/or curved paint film sections in a crease-free manner and/or to be able to cover three-dimensionally curved surfaces in a crease-free manner and nevertheless to be able to use structurally simple, cost-effective and lightweight robotic tools, use is made according to the invention of a rectangular film composite 10, 20 which protrudes on all sides over the bodywork portion 3 to be covered and which is secured on all four sides in the application tool 33 by a correspondingly rectangular suction frame 35 and is held under tensile stress. The protective strip 11, 23 on the adhesive side is removed from the paint film 12, 22 in a stationary and complete manner before the application operation. As the paint film 12, 22 continues to be pressed on, it is held under tensile stress in particular transversely to the direction in which the pressing-on operation continues. The latter is particularly important for a crease-free application, in particular if the surface to be covered is three-dimensionally curved.

Figure 15:
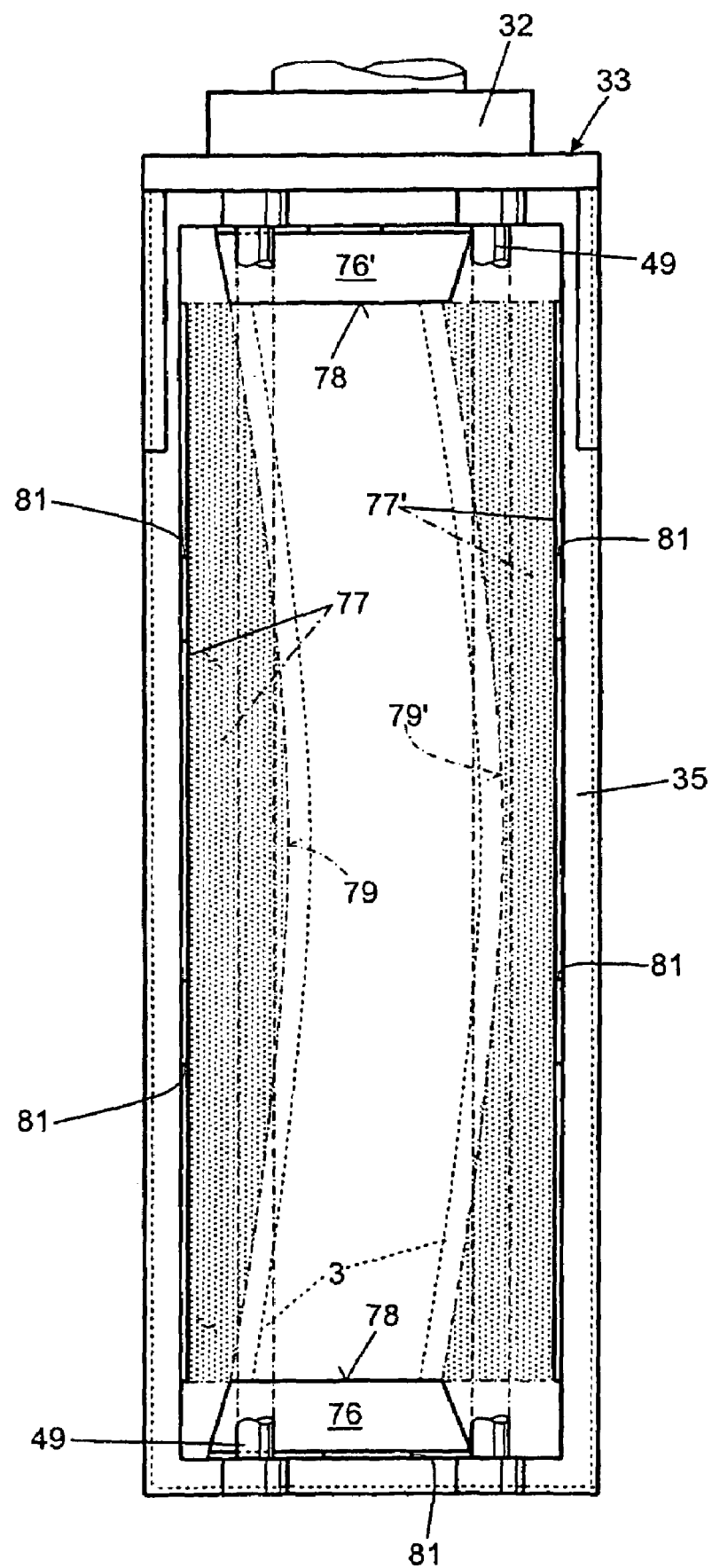
FIG. 15 shows a plan view of the application tool according to FIGS. 1 to 7, with the cutting templates which can be swung out particularly being illustrated here.

Before further aspects in terms of the method are discussed, the device parts for the application of the paint film in a manner suitable for automation will first be discussed. The use of a two-layered film composite 10 is taken as the basis in most of the illustrations, and so this will be discussed in more detail first. In the case of this simpler film composite, all that is provided apart from the actual rectangular paint film 12 is a protective strip 11 which completely covers the adhesive side of the paint film. Attached to a narrow side of the rectangular film strip is a short contact piece 13 which extends over the entire narrow side and is continuously connected to the protective strip. If paint film also adheres in the region of the contact piece, this paint film piece 14 has to be completely separated from the usable part 12 of the paint film by a narrow interruption 15. The three-layered film composite 20 will be discussed in more detail further below in conjunction with FIGS. 14 and 15. In each case, the film composite 10, 20 containing the paint film 12, 21 is designed with respect to its outer contours as a rectangle which protrudes over the bodywork portion 3 to be covered on all sides, i.e. also on the longitudinal sides, to be precise by more than just by the width of a lateral fold. The excess length of the paint film that is not required is removed toward the end of the application operation by an operation to cut the paint film into shape, which takes place with the paint film still in the taut state. This will be discussed once again further below.

Figure 1:
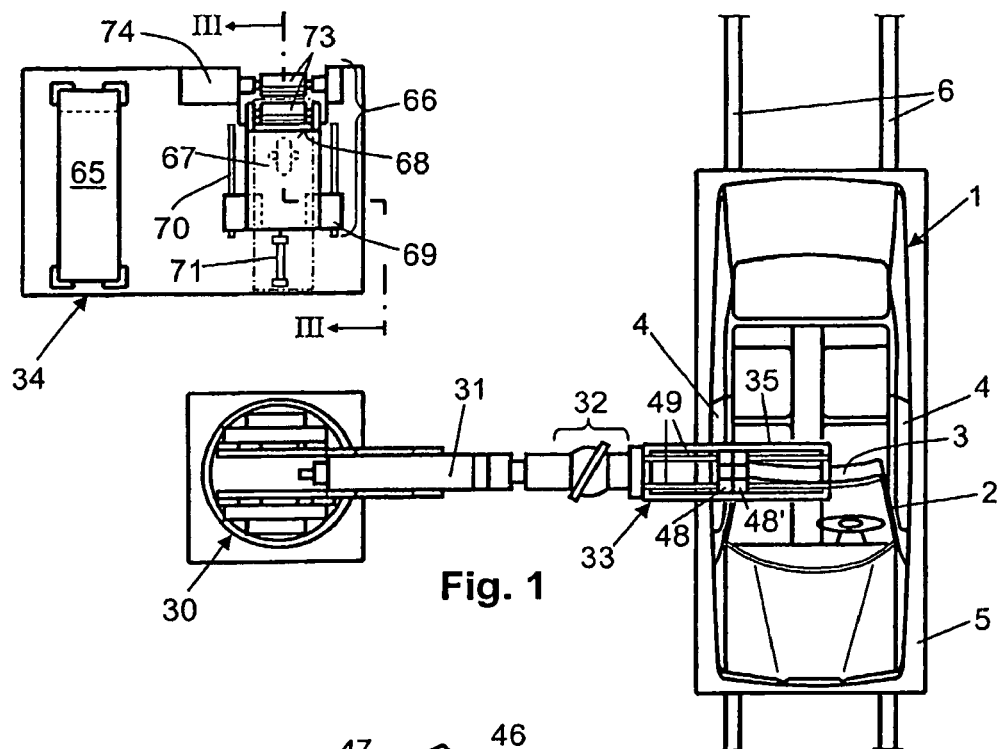
FIG. 1 shows the plan view of a station for the automated application of paint film.

For the automated application of the self-adhesive paint film, the bodywork 1, inter alia, which is placed on a bodywork carrier 5, is guided through the application station, illustrated in basic outline in FIG. 1, with the bodywork carrier being moveable on guide rails 6. Before the application operation is carried out, the bodywork carrier 5, and with it the bodywork, is fixed in a defined position. The application takes place by means of a freely programmable industrial robot 30 to the working arm 31 or hand joint 32 of which is attached a freely manipulable application tool 33 with which the paint film of the film composite can be handled and the paint film application can be carried out.

The application tool contains a rectangular suction frame 35 which forms a picking-up plane 41 by means of its active suction surfaces and which is designed in accordance with the size of the film composite. It is capable of securing the film composite 10, 20 pneumatically on all four sides. With a suction frame of this type, the paint film of the film composite can be picked up from a held-ready flat position in a taut state into the application tool and can be handled in this manner by it. In particular, the paint film can be held under tensile stress in the longitudinal direction and transverse direction by the suction frame, which is important for a satisfactory application result of large and/or—as in the present case—curved paint film pieces and/or—as likewise provided—in the case of a three-dimensionally curved bodywork surface.

The film composites containing a respective paint film are held ready in the form of a storage stack 65 in a defined position on a holding-ready table 34 in the working region of the industrial robot 30, so that a respective film composite can be picked up into the application tool 33 by means of the suction gripper.

To expose the adhesive side of the paint film, which is held taut in the application tool, a device for grasping the contact piece 13 or 25 on the end side and for removing the protective strip 11 or 24 from the adhesive side is furthermore provided, the device being attached in a stationary manner in order to simplify the application tool, i.e. not being integrated in the application tool. In the case of the exemplary embodiment illustrated, this removal device 66 is likewise accommodated on the holding-ready table 34 on which the storage stack 65 of film composites is also held ready in a defined position. In this connection, for the sake of completeness it should be mentioned that, owing to this stationary and complete removal of the protective strip on the adhesive side, the application station should be carefully kept free from dust. This is because, under some circumstances, the removal of the protective strip can cause electrostatic potential to be released on the paint film, as a result of which dust particles could be attracted from the air. These would remain stuck to the adhesive side of the paint film and could later stand out unattractively on the applied paint film.

For the end-side grasping of the contact piece 13, 25 of the film composite 10, 20, a pair of gripping rollers 73 acting as a stationary gripper is provided, the two individual rollers of which can be moved apart in order to open the gripper and can be moved toward each other to close it. As a result, the contact piece can be secured in a fixed position. In addition, one of the two gripping rollers can be rotatingly driven in the direction of the rotary arrows by means of a rotary drive 74, so that, with the gripping rollers clamped together, a pull can also be exerted on the grasped contact piece. The removal device will be discussed in more detail further below; at this point, it should merely be mentioned that the protective strip on the adhesive side can be removed from the paint film, which is held taut, owing to a relative movement of the application tool 33 in relation to the stationary pair of gripping rollers 73 and/or a pull on the grasped contact piece 13, 25.

During the stationary removal of the protective strip 13, 24 on the adhesive side, a narrow radius of curvature r is forced, at least initially, in the protective strip 13, 24 by a moveable counterpressure blade 67 having a transverse edge 68 rounded in a defined manner being held against the advancing removal point. As a result, when the protective strip is removed from the paint film, the latter is prevented from being removed from the suction frame 35 at the same time. The counterpressure blade, which is of planar design, is arranged next to the stationary pair of gripping rollers 73, with the blade plane being arranged at a small distance above the pair of gripping rollers. The counterpressure blade, which is formed from a metal plate 2 to 3 mm thick, is held by a slide 69 which, for its part, is mounted moveably on guide rails 70 and is displaceable by means of a displacement drive 71. The front part of the counterpressure blade is supported by a supporting roller 72 in a defined height position, i.e. at a small distance above the pair of gripping rollers. As a result, the counterpressure blade is moveable parallel to itself within its own plane past the opening of the pair of gripping rollers at a presettable force. The front transverse edge 68 of the counterpressure blade is rounded in cross section and predetermines a small radius of curvature r of at most half the metal-plate thickness of the counterpressure blade. This radius of curvature is forced onto the flexible web material pulled over and beyond the transverse edge 68 with a certain tensile stress.

The operation and function of the removal device 66 will be explained below in conjunction with the working phases illustrated in FIGS. 3 to 6: the film composite 10 taken up from the storage stack 65 is picked up into the suction frame of the application tool 33 in such a manner that the contact piece 13 protrudes at that end of the suction frame which lies opposite the robot hand joint 32. With the suction frame held in a steeply propping manner, this protruding contact piece is lowered into the opening between the gripping rollers 73, which is illustrated on the right in FIG. 3 in solid lines. The pair of gripping rollers is subsequently closed, and the application tool together with the suction frame is pivoted about the free, lower end edge of the suction frame, as virtual pivoting center, into the flat position indicated by chain-dotted lines. Subsequently, according to the illustration in FIG. 4, the counterpressure blade 67 is pushed forward until the rounded blade edge 68 comes to lie above the roller gap clamping the contact piece. If the clamping rollers are now driven in the direction of the rotary arrows, a pull is exerted on the contact piece, so that the film composite is pulled tightly around the rounded portion of the blade edge and the relatively small radius of curvature r is forced on it. At the beginning of the removal operation, the interruption 15 is still situated in the planar region of the counterpressure blade and still in front of the end edge of the suction frame. As soon as the application tool 33 is displaced horizontally in the arrow direction, the contact piece 13 and the initial region of the protective strip 11 on the adhesive side are removed downward over the blade edge 68 by the pair of gripping rollers driven in rotation. However, the paint film, which is secured by the suction frame right into the end region does not take part in the sharp angling about the blade edge, but rather continues to travel—as indicated in the phase according to FIG. 5—horizontally with the suction frame. This is the most critical moment during the removal of the protective strip on the adhesive side. The size of the radius of curvature r, above all, is responsible for reliably separating paint film and protective strip; the smaller this radius of curvature is, the more reliably are the layers separated. Subsequently, by continuing to move the application tool horizontally over the counter-pressure blade and the pair of gripping rollers, the protective strip 11 on the adhesive side is completely removed from the paint film 12 secured by the suction frame; a phase shortly before the end of this operation is illustrated in FIG. 6.

In principle, the removal of the protective strip 24 on the adhesive side from a three-layered film composite 20 picked up into the application tool also proceeds in the same manner. However, in this case not only is the protective strip 24 on the adhesive side removed, but also the waste part 22 of the paint film outside the interruption 27, which encircles it linearly, is removed from the protective strip on the upper side and from the usable part 21 of the paint film.

The application tool furthermore contains at least one press-on roller 45 or press-on doctor 55 which is moveable in the longitudinal direction of the paint film 12 or 21 and can be lowered from a rest position moved away from the picking-up plane 41 into a working position situated in the region of the picking-up plane. In this case, the paint film which is held at a small distance above the bodywork part 3 is progressively pressed onto the bodywork part from the spaced-apart position at a predetermined force by means of the press-on roller or press-on doctor.

Figure 2:
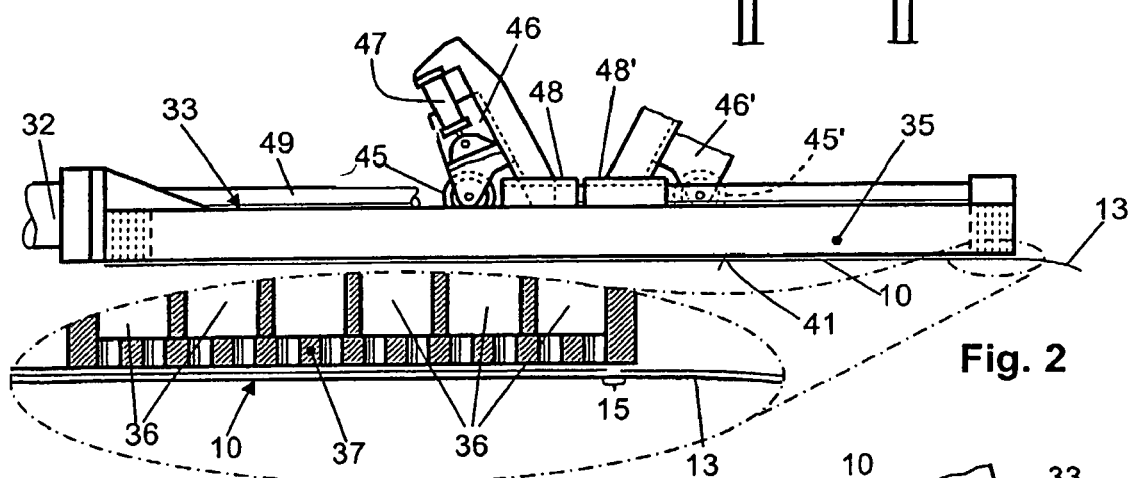
FIG. 2 shows the side view of an application tool with a two-layered film composite which has been picked up.
Figure 3:
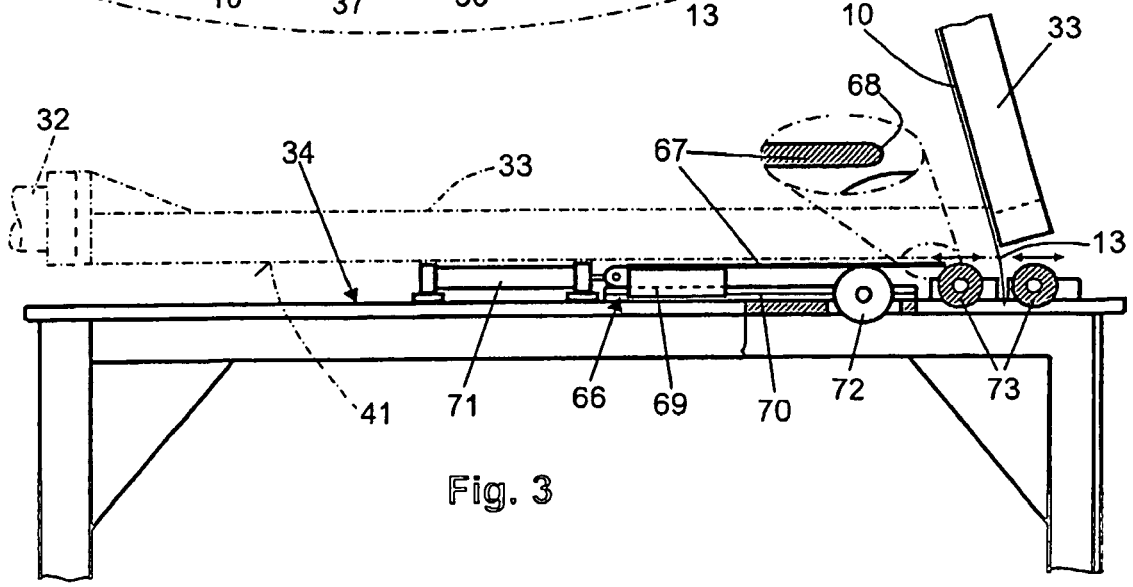
FIGS. 3 to 6 show four different phases during the removal of the protective strip from the paint film with the assistance of a stationary removal device.
Figure 4:
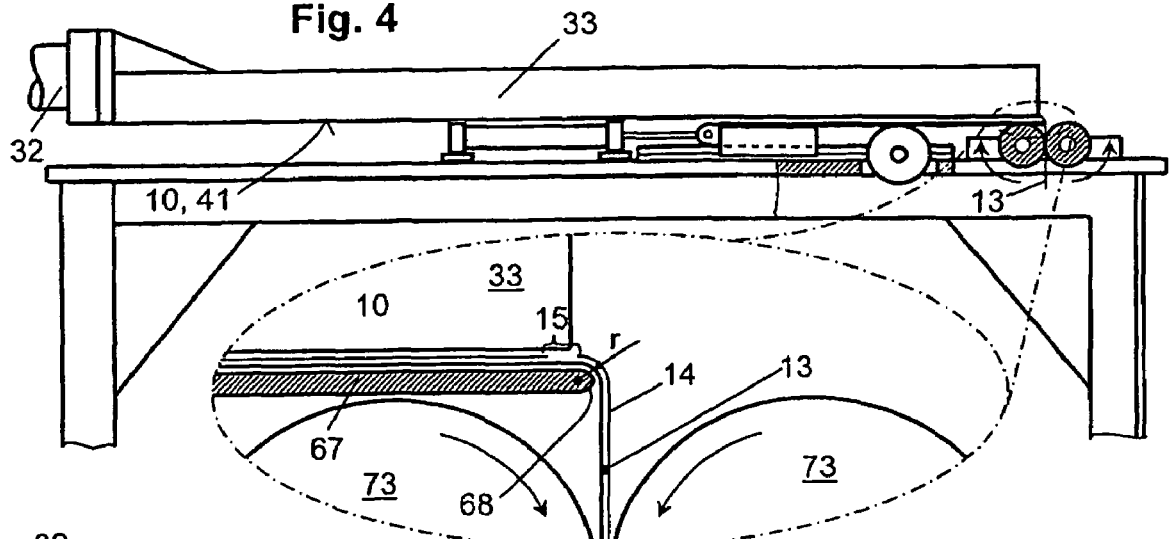
Figure 5:
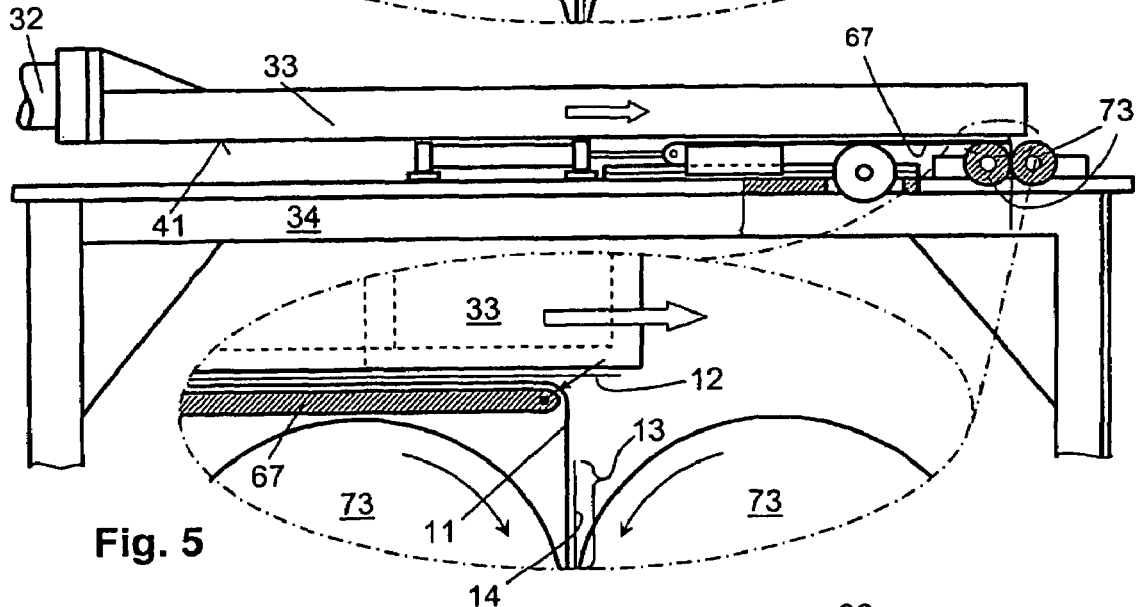

As can be seen in FIG. 2, a press-on roller 45 or 45' is held on a lifting slide 46, 46' which can be moved in a sliding guide and can be driven in the lifting direction by means of a lifting drive 47, with the sliding guide being arranged virtually transversely, i.e. inclined at an obtuse angle with respect to the picking-up plane 41. Owing to this arrangement, the press-on roller can be lifted into the rest position illustrated in FIG. 2 or can be lowered into the working position illustrated in FIGS. 8 to 10. The sliding guide for the lifting slide 46, 46' is, for its part, attached to a moving slide 48, 48', which moving slides can be displaced in the longitudinal direction of the suction frame 35 and parallel to the picking-up plane thereof on guide rods 49. Of course, each of the moving slides is also in each case assigned a moving drive, so that each of these slides or the associated press-on member can be displaced in a specific manner in the longitudinal direction; however, this displacement drive is not illustrated in the drawing.

For the automated paint film application, use can be made of a film composite 10 which contains just two layers, namely the paint film 12 which is unprotected on the visible side and a protective strip 11 which adheres to it on the adhesive side, which film composite is designed overall as a rectangular section protruding on all sides over the bodywork portion 3 to be covered. In this case, the paint film 12, after the protective strip 11 has been removed from it, is handled directly and solely by the application tool 33 and is applied to the bodywork part 3. However, following the application, the paint film has to be cut into shape.

If a two-layered film composite is to be used in which the paint film is exposed on its visible side, then said paint film has to be treated gently during the application and must not be pressed onto the bodywork part with a sliding doctor. On the contrary, in such a case, a press-on roller 45 which is of cylindrical or slightly convex design and is provided with an elastic covering 50 is to be used. When the paint film and the press-on roller bear against the bodywork part 3 under the press-on force, the elastic covering is flattened more sharply in the centre than at the ends on account of the slight curvature of the bodywork surface in the direction of the surface lines of the press-on roller, i.e. a lenticular flattening zone 51 is formed which is wider in the center of the roller than at the roller ends. The boundary edge 52 of the flattening zone, which edge is at the front in the advancing direction, is essentially symmetrical and runs in a slightly curved manner, with the center of the boundary edge running ahead of the ends.

When the simpler, two-layered film composites 10 are used, after the paint film 12 is applied to the bodywork part 3 the unusable, protruding part of the paint film that only served to be able to exert tensile stress on the usable part of the paint film, has to be cut off, i.e. the paint film has to be cut into shape. This expediently takes place when the paint film is still held taut. For this purpose, four cutting templates 76, 76', 77, 77' for cutting the applied paint film into shape are integrated in the application tool. Moveable cutters can be guided in a precise position along the guide edges 78, 79, 79' thereof. In the case of the exemplary embodiment illustrated, the cutting templates are fastened to the inside of the suction frame in a manner such that they can be pivoted via hinges 80. From a folded-down position secured by a holding magnet 81, the cutting templates can be lowered onto the taut paint film and the exposed guide edge of the templates can be followed with a moveable cutter. However, the movement drive for pivoting the cutting templates from the rest position into the working position and vice versa is illustrated just as little as the cutters which can be guided along the feed guide edges and the movement drive thereof. The cutters may be, for example, a flexible steel band which is guided perpendicularly to the plane of the templates and which bears a multiplicity of small sharp cutting teeth on its longitudinal side—in a similar manner to a saw band. A band-shaped cutter of this type needs only to execute small cutting strokes, since all of the adjacent cutting teeth are used simultaneously. In the case of a lower degree of mechanization, the cutting templates may also be pivoted to and fro manually between their folded-down position and the working position. Similarly, in such a case, hand-guided cutters can be used for the cutting into shape. This would substantially simplify the application tool but makes it necessary for people to work in the immediate vicinity of the robotic tool.

The two cutting templates 76 and 76', which are assigned to the narrow sides of the suction frame, are in principle identical in shape and have an approximately rectilinear guide edge 78 are used first, to be precise shortly before the application operation is completely ended, so that the trim line on the end side of the paint film is still at a certain distance from the bodywork surface. The cutting templates 77 and 77' assigned to the longitudinal sides of the suction frame are used only after the application operation is ended. Their guide edges 79 and 79' lie approximately equidistantly from the corresponding edges of the bodywork part 3, so that a cutter entering the applied paint film runs next to the bodywork surface.

Figure 12:
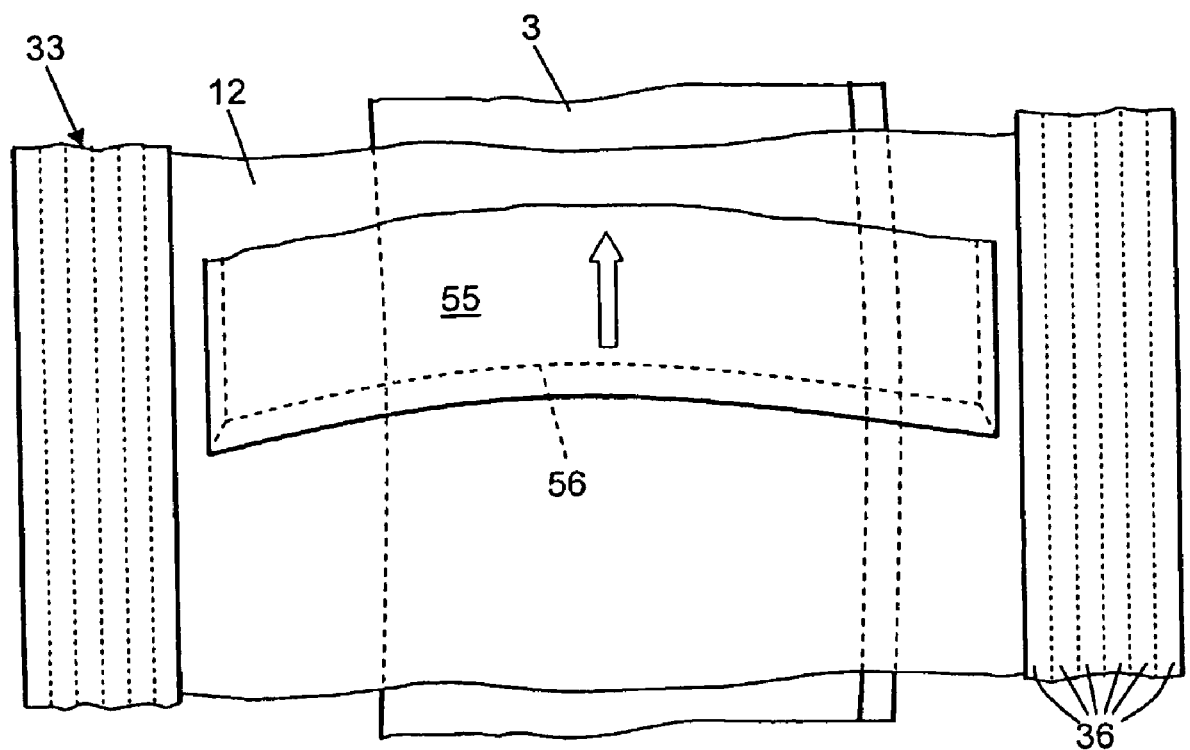
FIG. 12 shows a partial plan view of an application tool in which the paint film to be applied is pressed on by means of a single-part press-on doctor with a curved working edge.

Instead of the press-on rollers 45 shown in FIGS. 2 and 7 to 10, the press-on element may also be designed in the form of a single-part element 55, as indicated in FIG. 12. The single-part doctor blade of the press-on doctor 55, which blade is preferably composed of a hard felt, has a curved working edge 56 with which a certain width spreading effect can be exerted on the paint film as the pressing-on operation progresses.

Irrespective of the type of press-on element used, it is at any rate to be designed and/or arranged in such a manner that the advancing line of application 52 of 56 to be exerted by them runs in an approximately symmetrically curved manner, with the center of the line of application 52, 56 running ahead of its ends. As a result, as the line of application advances, the abovementioned width spreading effect can be exerted on the paint film, which is important for a grease and bubble-free application result.

A doctor 55 operating in a sliding manner is possible as press-on element only in the situations in which a paint film section 21 to be applied is integrated in a three-layered film composite 20 according to FIGS. 13 and 14. A film composite of this type not only has a protective strip on the adhesive side of the paint film 21, 22 (protective strip 24 on the adhesive side) but also such a protective strip on its visible side (protective strip 23 on the outer side). The three-layered film composite 20 is not only more complicated than the two-layered film composite 10 because of the additional protective strip 23 but also the usable section 21 of the paint film is already contained in prefabricated form in the film composite. Despite the prefabricated form of the paint film section 21, at least the protective strip 23 on the outside is of rectangular design and is significantly larger in its external dimensions than the usable paint film section, so that the latter can be picked up indirectly, i.e. with the protective strip 23 on the outer side fitted in between, in the suction frame 35 of the application tool, and also a tensile stress can be exerted indirectly via the protective strip on the paint film in the longitudinal direction and transverse direction.

So that the film composite composed in such a manner can be stacked lying flat in a relatively large number to form a storage stack, a web material of the same thickness, which is likewise composed of self-adhesive paint film, is provided in the region surrounding the usable section 21 of the paint film as far as the edge of the protective strip 23 on the outer side, the web material surrounding the usable section 21 along an encircling, equidistant interruption 26. This paint film part surrounding the usable part 21 of the paint film constitutes a waste piece 22 which is removed before the actual application together with the protective strip 24 on the adhesive side and the contact piece 25 from the protective strip 23 on the outside, which is held taut in the suction frame, and from the paint-film usable part 21. A small subsection of the protective strip on the outside is also attached in the region of the contact piece 25 of the three-layer film composite—in a similar manner as in the case of the two-layered film composite—for reasons of uniform thickness, but said subsection is completely separated from the protective strip 23 on the outside owing to a rectilinear, continuous interruption 27 in the transition region to that part of the film composite which is covered by the suction frame.

After the paint film section 21 has been completely pressed on, the rectangular protective strip 23 on the outside is removed owing to a suitable movement of the application tool 33 from the paint film 21 applied to the bodywork part 3 and is subsequently discarded via a waste collection container.

An advantage of the three-layered film composite over the two-layered one is firstly that the subsequent cutting of the applied paint film into shape is omitted. A further advantage resides in the application pressures which are higher in comparison to press-on rollers and can be exerted by a felt doctor. Under some circumstances, higher application pressures may be responsible for a more secure adhesion of the paint film on the bodywork surface.

In the case of the exemplary embodiment illustrated in the figures, the bodywork part 3 is curved and in this respect is of symmetrical design. This makes it necessary for the pressing of the paint film onto the surface of the bodywork part to be carried out symmetrically. Accordingly, the moveable press-on elements—in FIG. 2 press-on rollers 45 and 45' are provided—are doubled and arranged mirror-symmetrically with respect to each other within the application tool. If the need arises, two separately moveable press-on doctors 55 could also be provided mirror-symmetrically in the application tool. When the paint film is applied, these press-on elements are moved simultaneously from the longitudinal center of the application tool 33, i.e. from the point of first contact of the paint film 12, 21 on the bodywork part 3 (see FIG. 7, the tool position illustrated in solid lines) toward the ends of the application tool 33. However, in this case only one of the press-on elements is initially used. Only when the press-on element used first has been moved a certain distance from the center and has opened up the center position can the second press-on element also be brought into the working position and subsequently into a mirror-inverted position with respect to the first, waiting press-on element. From then on, the two press-on elements are displaced together and in a mirror-inverted manner with respect to each other toward the opposite ends of the bodywork part, with a press-on force being continuously exerted on the paint film to be applied.

During the application of the paint film, a tensile stress has to be exerted on the paint film in the longitudinal direction and in the transverse direction, so that it is stuck onto the bodywork part in a crease- and bubble-free manner. The tensile stress which is directed transversely to the direction in which the pressing-on operation continues is exerted in the paint film by the taut plane 41 of the suction frame progressively approaching the bodywork part 3 to be covered, the latter entering ever deeper into the taut plane, i.e. entering the opening of the suction frame. However, care has to be taken here to ensure that a wedge-type gap 53 (FIG. 10) opening in the direction in which the line of application continues is maintained at the advancing point of effect of the line of application between the taut paint film 12 and the surface of the bodywork part 3. It is absolutely necessary to prevent the paint film from running ahead and touching the bodywork surface, i.e. before the advancing line of application has reached the contact point. On the contrary, it must be ensured that the contact for the first time locally between paint film and bodywork surface is produced exclusively by the action of the advancing line of application.

Of course, the described "entering" of the curved bodywork part into the opening of the suction frame also causes a tensile stress to be exerted on the paint film in the longitudinal direction. As illustrated by FIG. 7, the paint film, which is held taut, or the picking-up plane 31 is also inclined, as it is being pressed onto the bodywork 3 to be covered, at the point of the line of application in accordance with the inclination of the surface of the bodywork part 3, i.e. is aligned tangentially to the said line of application and is correspondingly guided in inclination.

Figure 11:
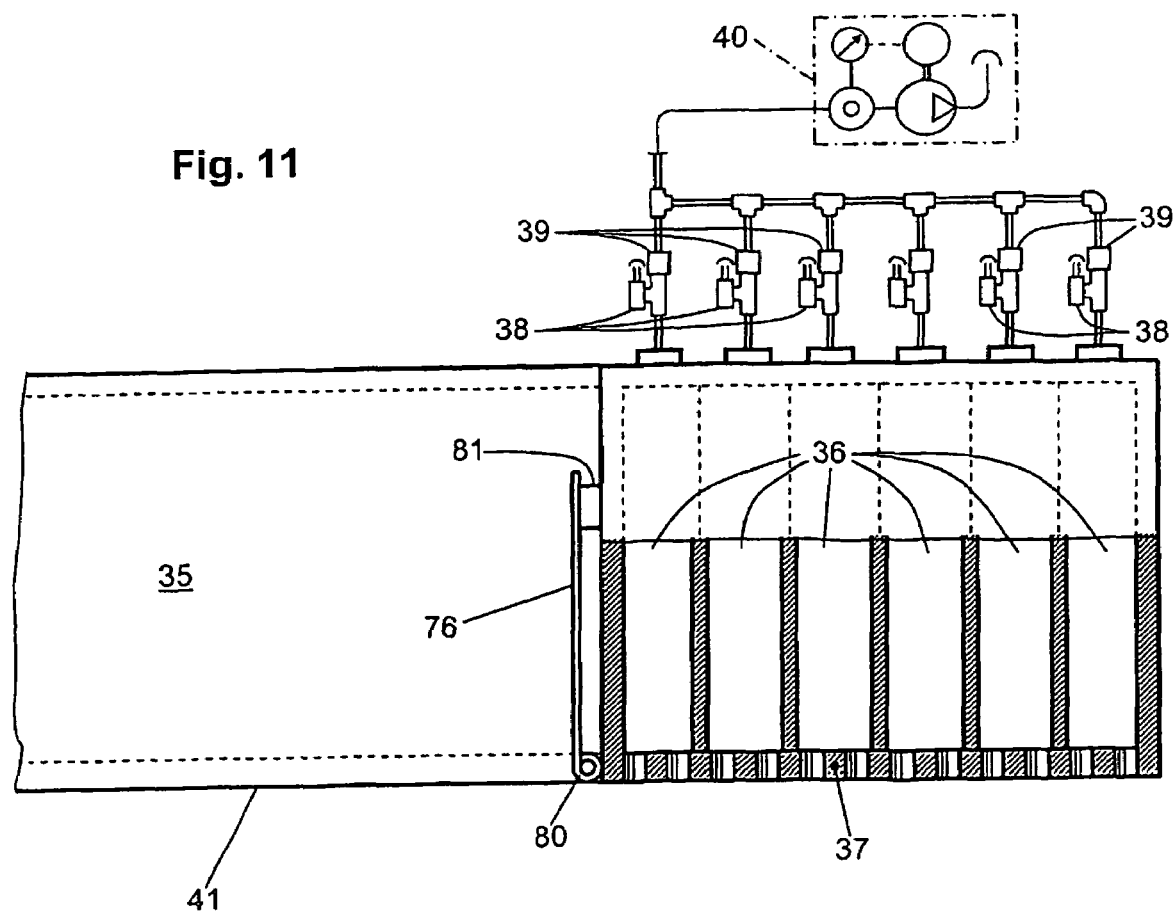
FIG. 11 shows a detail, shown on an enlarged scale, in respect of the division of the chambers of the frame limbs of the suction frame and the vacuum supply thereof and also a cutting template which can be swung out.

The tensile stress acting on the paint film must not be too high because a stretched paint film will contract after application, which, in the case of very high contraction forces, may result in the applied paint film creeping on the bodywork surface. As the paint film continues to be pressed on, the tensile stress in the taut part of the same or of the film composite is therefore limited by the edge of the paint film 12 or of the film composite 23, 21 being secured with a limited force, so that the paint film 12 or the film composite 23, 21 can slide out of the edge clamping means. For this purpose, the frame limbs of the suction gripper 35 are divided into a plurality of suction chambers 36 which are subjected separately to vacuum, are directly adjacent to one another and extend in the longitudinal direction of the respective frame limb. In addition, the vacuum supplied to the suction chambers 36 is provided in each case with a bypass valve 38 for controlling the level of the vacuum (FIG. 11). Opening of the bypass valve of a suction chamber enables the vacuum effective therein to be lowered to a presettable partial amount of the full vacuum available through the vacuum source 40. As a result, the holding force which can be exerted on the paint film by this suction chamber also drops, so that the paint film, which is under tensile stress, can slide a certain amount over the perforated plate 37 if a certain limit value is exceeded. When the paint film slides over the perforated film, the suction chambers are gradually exposed, i.e. progressing from the outside to the inside. In order not to allow an unnecessarily large amount of additional air to thereby flow into the exposed suction chambers, which, under some circumstances, could result in the vacuum of the source 40 collapsing, a shutoff valve 39 is also provided in the vacuum supply to each suction chamber.

The advantages which can be obtained with the invention reside in the following:

The robotic tool required for the automatic application of paint film is of really simple construction and is therefore very favorably priced.

Simple, namely unprefabricated two-layered paint film sections, but also three-layered paint film sections which are already cut into shape can be processed.

Very large paint film sections which can no longer be handled manually by an individual person can readily be processed.

The paint film sections to be processed may have any desired shape, may in particular—as can be seen in the exemplary embodiment illustrated—run in a curved manner in the longitudinal direction.

The bodywork surface to be covered may readily be three-dimensionally curved.

Despite these circumstances—large and/or curved film section and/or three-dimensionally curved bodywork surface—which are adverse to a secure application of film, the paint film can be applied to the bodywork surface in bubble- and crease-free manner and in a precise position.

What is claimed is:

1. A method for the automated application of a self-adhesive paint film to a bodywork part secured in a defined position using a freely programmable industrial robot provided with an application tool, the paint film being held ready in a multi-layered film composite in a further defined position in the working region of the industrial robot for picking up into the application tool using suction grippers, the multi-layered film including a protective strip on an adhesive side of the paint film and being provided with a contact piece attached on an end side, the protective strip being grasped at the contact piece and removed from the paint film, the paint film being held taut, and the adhesive side is thus exposed and the paint film being held taut being aligned in a precise distance position above the bodywork part to be covered, and, from a visible side of the paint film, with the paint film held in a fixed position over the bodywork part to be covered, the paint film is pressed progressively onto the bodywork part from the spaced-apart, taut position owing to a line of application moving over the paint film, the method comprising:

securing a rectangular section of the multilayered film composite protruding on all sides over the bodywork portion to be covered on all four sides in the application tool;

removing the protective strip on the adhesive side from the paint film in a complete manner with a stationary gripper or gripper rollers, and as the paint film is pressed on in a pressing-on operation, keeping the paint film under tensile stress at least transversely to the direction of the pressing-on operation as the pressing on operation continues.

2. The method as claimed in claim 1, wherein the tensile stress directed transversely to the direction of the pressing-on operation is exerted in the paint film by a taut plane of the paint film progressively approaching the bodywork part to be covered, the bodywork part entering ever deeper into the taut plane while ensuring that, at an advancing point of effect of the line of application between the taut paint film and the surface of the bodywork part, a wedge-type gap opening in the direction in which the line of application continues is maintained.

3. The method as claimed in claim 2 wherein as the paint film continues to be pressed on, the tensile stress in the taut part of the paint film or of the film composite is limited by an edge of the paint film or of the film composite being secured with a limited force, so that the paint film or the film composite can slide out of an edge clamp.

4. The method as claimed in claim 1 wherein as the paint film continues to be pressed on, in addition to the transversely directed tensile stress a width spreading effect is also exerted on the paint film by a press-on doctor or press-on roller producing the continuing line of application.

5. The method as claimed in claim 4 wherein the width spreading effect is exerted owing to a symmetrically curved profile of the advancing line of application, with a center of the line of application running ahead of application ends.

6. The method as claimed in claim 1 wherein the multilayered film composite is a three-layered film composite in which the paint film is covered on the adhesive side by a protective strip and is contained in the form of a prefabricated paint film section and the paint film section is covered on its non-adhesive visible side by a self-adhesive protective strip of the rectangular section protruding over the paint film section on all sides, the paint film section being handled by the application tool indirectly and after the paint film section has been completely pressed on, the rectangular protective strip is removed owing to a suitable movement of the application tool from the paint film applied to the bodywork part, the protective strip being subsequently discarded via a waste collection container.

7. The method as claimed in claim 1 wherein the multilayered film composite is made of only two layers, the paint film which is unprotected on the visible side and a protective strip adhering to the paint film on the adhesive side, the and which is designed overall as the rectangular section protruding on all sides over the bodywork portion to be covered, the paint film, after the protective strip has been removed, being handled directly and solely by the application tool and being applied to the bodywork part, the paint film being only subsequently cut into shape.

8. The method as claimed in claim 7 wherein the paint film is cut into shape with the paint film still being held in the application tool using moveable cutters guided along templates integrated in the tool.

9. The method as claimed in claim 1 wherein during the stationary removal of the protective strip on the adhesive side, a narrow radius of curvature is forced, at least initially, in the protective strip by a moveable counterpressure blade having a transverse edge rounded in a defined manner being held against the advancing removal point.

10. The method as claimed in claim 1 wherein, during the application of paint film to the bodywork part when the bodywork part is elongated and curved symmetrically in a longitudinal direction, the paint film approaches the bodywork part in a region of the centrally situated line of symmetry and is pressed on from there by the line of application and a further simultaneously effective line of application advancing toward ends of the bodywork part.

11. The method as claimed in claim 10 wherein the paint film, which is held taut, is inclined, as the paint film is being pressed on to the bodywork part to be covered, at the point of the line of application in accordance with an inclination of a surface of the bodywork part.

12. A device for the automated application of self-adhesive paint film to a bodywork part secured in a defined position, the paint film being contained in a multi-layered film composite including, apart from the paint film itself, at least a protective strip on an adhesive side of the paint film with a contact piece protruding on an end side and being connected to the protective strip, the device comprising:
   an application tool capable of being manipulated by a freely programmable industrial robot and capable of handling the paint film or the film composite and applying the paint film to the bodywork part;
   the application tool including a suction gripper forming a picking-up plane via active suction surfaces, the paint film or the film composite capable of being picked up from a held-ready flat position into the application tool in a taut state via the suction gripper, the suction gripper being capable of handling the paint film or film composite;
   a device for grasping the contact piece on the end side and for removing the protective strip on the adhesive side from the tautly-held paint film to expose the adhesive side;
   the application tool including a press-on doctor or press-on roller moveable in a longitudinal direction of the paint film and capable of being lowered from a rest position, in which the press-on doctor or press-on roller is moved away from the picking-up plane, into a working position situated in a region of the picking-up plane, in which case the paint film, which is aligned in a precise distance position above the bodywork part to be covered, is capable of being pressed progressively onto the bodywork part from the spaced-apart position at a predetermined force using the press-on doctor or press-on roller,
   the film composite containing the paint film being designed with regard to its outer contours as a rectangle protruding over the bodywork portion to be covered on all sides,
   the suction gripper being designed as a rectangular suction frame corresponding to a size of the film composite and capable of securing the film composite on all four sides,
   the device for grasping the contact piece on the end side of the film composite being a stationary gripper or gripper rolls for positionally fixed securing of the contact piece with which the protective strip on the adhesive side is capable of being removed from the tautly-held paint film in the application tool, owing to a relative movement of the application tool in relation to the stationary gripper or gripper rolls or a pull on the grasped contact piece.

13. The device as claimed in claim 12 wherein the press-on roller or press-on doctor is designed or arranged in such a manner that an advancing line of application capable of being applied runs in a symmetrically curved manner, with a center of the line of application running ahead of application ends.

14. The device as claimed in claim 12 wherein the press-on roller is provided with an elastic covering and is of cylindrical or slightly convex design and, when bearing against the bodywork part, is more sharply flattened under the press-on force in the center than at the ends of the roller.

15. The device as claimed in claim 12 further comprising an additional separate press-on roller or additional press-on doctor, the press-on roller or press-on doctor and the additional press on roller or additional press-on doctor in each case being displaceable in themselves in the longitudinal direction and being arranged in a mirror-inverted manner with respect to each other in the application tool and capable of being moved simultaneously from a longitudinal center of the application tool toward ends of the application tool.

16. The device as claimed in claim 12 further comprising a planar counterpressure blade, the plane of which is arranged at a distance above the gripper or gripping rollers and which can be moved parallel to itself in the plane of the counterpressure blade past a gripping opening of the gripper or gripping rollers with a presettable force in such a manner that the blade stretches the protective strip on the adhesive side in an L-shaped or U-shaped manner, the protective strip being grasped on the one hand by the stationary gripper or gripping rollers and on the other hand being held in the picking-up plane of the application tool, and forces a narrow radius of curvature on the protective strip as the protective strip loops around a transverse edge of the counterpressure blade.

17. The device as claimed in claim 12 wherein for each frame limb of the suction frame, the application tool has a respective cutting template for cutting the applied paint film into shape, on which cutting templates cutters are guided moveably in a precise position.

18. The device as claimed in claim 12 wherein the frame limbs of the suction gripper are divided into at least two suction chambers capable in each case of being separately subjected to a vacuum or ventilated, are directly adjacent to each other and extend in the longitudinal direction of one of the frame limbs.

19. The device as claimed in claim 12 wherein a vacuum supplied to suction chambers of the suction gripper is in each case provided with a bypass valve for controlling level of the vacuum.

* * * * *